United States Patent [19]
Kano et al.

[11] Patent Number: 4,806,757
[45] Date of Patent: Feb. 21, 1989

[54] INFORMATION READING APPARATUS FOR RADIATION IMAGE

[75] Inventors: Tsuyoshi Kano, Higashiyamato; Tetsuhiko Takahashi, Tokyo; Kenichi Okajima, Hohya; Kenji Umetani, Kokubunji; Saburo Ataka; Hisatake Yokouchi, both of Tokyo; Ryuichi Suzuki, Koganei, all of Japan

[73] Assignee: Hitachi, Ltd., Tokyo, Japan

[21] Appl. No.: 924,735

[22] Filed: Oct. 30, 1986

[30] Foreign Application Priority Data

Nov. 7, 1985 [JP] Japan .................. 60-248027
Feb. 28, 1986 [JP] Japan .................. 61-41772

[51] Int. Cl.$^4$ .......................................... G02B 26/10
[52] U.S. Cl. ............................ 250/327.2; 250/484.1; 250/487.1; 252/301.4 H
[58] Field of Search ............... 250/327.2, 484.1, 487.1, 250/486.1; 252/301.4 H

[56] References Cited

U.S. PATENT DOCUMENTS

| | | | |
|---|---|---|---|
| 4,149,902 | 4/1979 | Mauer et al. | 250/487.1 |
| 4,298,802 | 11/1981 | Quella et al. | 250/484.1 |
| 4,598,200 | 7/1986 | Yaniguchi | 250/327.2 |
| 4,598,207 | 7/1987 | Naruse et al. | 250/327.2 |
| 4,616,129 | 10/1986 | Yamada et al. | 250/327.2 |
| 4,691,232 | 9/1987 | Lange | 358/111 |

FOREIGN PATENT DOCUMENTS 0174875 3/1986 European Pat. Off. ...... 252/301.4 H
1123829 6/1986 Japan ................... 250/484.1

Primary Examiner—Carolyn E. Fields
Assistant Examiner—Richard Hanig
Attorney, Agent, or Firm—Antonelli, Terry & Wands

[57] ABSTRACT

When the laser-stimulable phosphor plate of an information reading apparatus for radiation image is constituted of CsI as the base and 0.0003 to 0.03% in atomic ratio of Na, the output signal of the information reading apparatus can be increased and the decay time thereof can be shortened. When output signals are produced by detecting fluorescence emitted from a fluoroscopic plate disposed in confrontation with the laser-stimulable phosphor plate, there is provided an information reading apparatus for radiation image having an improved S/N ratio and a high efficiency of taking in laser-stimulated luminescence. Further, instead of Na or together with Na, there may be added at least one element selected from the group consisting of Li, K, Rb, Cu, Au, Be, Mg, Ca, Sr, Ba, Zn, Cd, Hg, B, Al, Ga, In, Tl, Sc, Y, La, Ce, Pr, Nd, Sm, Eu, Gd, Tb, Dy, Ho, Er, Tm, Yb, Lu, Si, Ti, Zr, Ge, Sn, Pb, As, Sb, and Bi. In this case, the total content of these elements is set to be 0.00001 to 1% in atomic ratio.

20 Claims, 2 Drawing Sheets

INFORMATION READING APPARATUS FOR RADIATION IMAGE

BACKGROUND OF THE INVENTION

The present invention relates to an apparatus for converting radiation image information into electric signals, and particularly to an apparatus for converting low-dose X-ray image information into electric signals having a high resolution and/or a high S/N ratio (signal/noise ratio) The fundamental construction of an information reading apparatus for radiation image is disclosed in, for example, U.S. Pat. No. 3,859,527.

The technique of converting radiation image information into digital electric signals to obtain an image easy to use in diagnoses has recently become important. One example of the above-mentioned technique is disclosed in Japanese Patent Laid-Open No. 12,429/1980, and involves a process comprising irradiating a powder-screened data storage phosphor plate having a laser-stimulable phosphor powder BaFX Eu$^{2+}$ (wherein X is Cl, Br, or I) applied thereto with X-rays and detecting image information accumulated in the powder-screened data storage phosphor plate in the form of scanning He-Ne laser-stimulated luminescence. However, scattering of laser beams for reading is notably large in the laser-stimulable phosphor powder-screened plate. Therefore, when the plate thickness is increased, the image is disadvantageously blurred. On the other hand, when the plate thickness is decreased, the X-ray absorption coefficient is lowered, leading to an increase in necessary X-ray dose, which is unfavorable in medical diagnoses.

There has been proposed a process comprising irradiating a plurality of highly powder-screened sheets piled up and comprising a plastic base and a laser-stimulable phosphor powder applied thereto with X-rays, reading the sheets one by one, and piling up the signals [see a report of Miyahara et al. titled "Digital Radiography (DR) System and Its Sensor," Hoshasen Zoh Kenkyu, Vol. 14, No. 1, pp. 7 to 15 (1984)]. Although the X-ray absorption coefficient can be improved in this process, there is a problem of the noise as well as the time in reading being doubled.

The technique of efficiently converting laser-stimulated luminescence into electric signals is necessary in detection of laser-stimulated luminescence by irradiation with laser beams as described above. As disclosed in Japanese Patent Publication No. 51,099/1985, there has conventionally been adopted a process comprising adjoining one edge of a transparent sheet to a scanning line on a data storage phosphor plate mentioned above while adjoining the other edge of the sheet to the light receiving surface of a photodetector to guide laser-stimulated luminescence to the photodetector. This prior art technique of converting laser-stimulated luminescence into electric signals involves the following problems.

A first problem is that laser-stimulated luminescence is taken in from the edge of the sheet since the system of the process comprises taking directional laser-stimulated luminescence into the transparent sheet and guiding the luminescence to the photodetector with repetition of total reflection. This is because most of the luminescence is released into the outside from the reverse surface of the sheet if luminescence is taken in from a flat surface of the sheet. Since the width of the edge of the sheet cannot be so large, an improvement is restricted in an efficiency of taking in laser-stimulated luminescence.

A second problem is that the edge of the transparent sheet must be brought as close as possible to the surface of the data storage phosphor plate in order to improve the efficiency of taking in laser-stimulated luminescence. Further, in order to read laser-stimulated luminescence by two-dimensional light scanning, the relative positions of the edge of the transparent sheet and the data storage phosphor plate must be varied with the progress of photoscanning. Thus, a transferring mechanism is needed. When the distance between the edge of the transparent sheet and the data storage phosphor plate is varied, the output signal of the photodetector is changed. Therefore, transfer by the transferring mechanism must be made while keeping the distance constant. However, this is not easy. The necessity for the transferring mechanism provided in the vicinity of the surface of the data storage phosphor plate presents a grave difficulty, for example, particularly in using a data storage phosphor plate while cooling the same.

A third problem is that a space for allowing laser beams to pass through must be provided in the proximity of the edge of the transparent sheet in order to directly irradiate the data storage phosphor plate with laser beams. This is a restraint to the improvement in the efficiency of taking in laser-stimulated luminescence.

A fourth problem is that laser beams diffusely reflected from the data storage phosphor plate is guided to the photodetector by way of the transparent sheet to lower the S/N ratio of output signals.

None of the above-mentioned problems can be fundamentally solved by the prior art technique. Further, it is necessary to always accurately control the positional relationship among the site of laser irradiation, the data storage phosphor plate, and the transparent sheet.

A fifth problem is that economically usable transparent sheets (e.g., made of an acrylic resin) generally has an absorption zone in the ultraviolet region, thus restricting the usable range of wavelengths of laser-stimulated luminescence.

SUMMARY OF THE INVENTION

A first object of the present invention is to provide an apparatus which can eliminate the above-mentioned defects of the conventional laser-stimulable phosphor powder-screened plate, and which can secure electric signals including high-quality image information from a low-dose radiation. A second object of the present invention is to provide an information reading apparatus for radiation image, which can obviate the above-mentioned difficulties in the conventional technique of converting laser-stimulated luminescence into electric signals, and which can provide a high efficiency of taking in laser-stimulated luminescence with an improved S/N ratio without restriction of wavelengths of the laser-stimulated luminescence.

Description will now be given to attainment of the above-mentioned first object.

A material capable of eliminating the abovementioned defects of the conventional laser-stimulable phosphor powder-screened plate must satisfy the following conditions:

(1) a compound constituted of elements having a high X-ray absorption, namely a large atomic weight;
(2) a high efficiency of laser-stimulated luminescence;

(3) a substantial optical transparency to laser-stimulated luminescence and light beams for reading; and (4) a capacity of industrially producing a plate having a necessary area for radiographic diagnosis (typically 6 to 16 inches in diameter).

As a result of an extensive search for materials satisfying all of the above-mentioned conditions, the inventors of the present invention have found that CsI-based phosphors, particularly CsI:Na maintained at around the liquid nitrogen temperature (77° K.) can satisfy the above-mentioned conditions (Japanese Patent Application No. 244,435/1984), and have made further detailed investigations to find out a scope wherein particularly excellent properties can be exhibited.

In reading image information accumulated in a laser-stimulable phosphor plate by light scanning, image information having a high resolution cannot be read in a short time when the decay time of laser-stimulated luminescence is long.

It was reported that X-ray excitation luminescence of CsI:Na at a low temperature (20° K.) consisted of two components, i.e. blue luminescence at around 420 nm and ultraviolet luminescence at around 338 nm (290 to 360 nm) [see A. H. Kayal et al., Solid State Communications, 35, 457 (1980)]. Laser-stimulated luminescence of CsI:Na also consists of two components, i.e. blue and ultraviolet luminescences, like the above-mentioned luminescence. The decay time of blue luminescence is longer than that of ultraviolet luminescence. The use of ultraviolet luminescence at around 290 to 360 nm is preferred in application to the present invention.

CsI:Na has conventionally been used in an input fluoroscopic screen for an X-ray image intensifier. Since blue luminescence is effective in this application, the Na concentration is so set as to maximize the blue luminescence (about 0.05% in atomic ratio). In attaining the present invention, detailed investigations have been made on the Na concentration with a view to maximizing the laser-stimulated ultraviolet luminescence. As a result, it was found that the optimum value of the Na concentration lies in a region of concentrations lower than those conventionally used in X-ray image intensifiers (about 0.003% in atomic ratio). The sensitivity of a common photomultiplier is maximized in a blue region. Since the laser-stimulated ultraviolet luminescence of CsI:Na optimized in the present invention is very strong, the signal output of the photomultiplier is doubled as compared with that in the case of CsI:Na for a conventional X-ray image intensifier.

Description will now be given to attainment of the second object.

The aforementioned second object is attained by disposing a fluoroscopic plate capable of emitting fluorescence upon absorption of laser-stimulated luminescence in confrontation with a laser-stimulable phosphor plate (data storage phosphor plate), allowing laser-stimulated luminescence emitted upon irradiation with laser beams to be absorbed in the abovementioned fluoroscopic plate, and guiding fluorescence emitted in the fluoroscopic plate to a photo-detector.

The above-mentioned fluoroscopic plate is typically a thin flat plate, which takes in laser-stimulated luminescence from a flat surface thereof, not from an edge thereof, unlike conventional transparent sheets, to emit fluorescence in the fluoroscopic plate. Since the directivity of fluorescence is isotropic in the plate, a majority of the fluorescence is guided to the edges of the fluoroscopic plate while repeating total reflection on both surfaces of the plate. Thus, although part (15) of fluorescence is released to the outside as shown in FIG. 5 illustrating a fluoroscopic plate, a majority (16) of fluorescence is guided to a photodetector by total reflection. (In a conventional transparent sheet, incident luminescence from the side of a flat surface arrives at the reverse surface while substantially keeping its directivity. Thus, a majority of luminescence pierces the plate.) When an edge of a fluoroscopic plate is provided in the proximity of a photodetector while treating the other edges of the fluoroscopic plate in such a way as to allow them to reflect luminescence, fluorescence having an intensity well in accordance with the intensity of laser-stimulated luminescence can be very efficiently guided to the photodetector.

In FIG. 5, the numeral 9 refers to a fluoroscopic plate capable of converting laser-stimulated luminescence into fluorescence with different wavelengths, while the numeral 10 refers to a photo-multiplier and the numeral 14 refers to laser-stimulated luminescence.

Since the above-mentioned fluoroscopic plate can sufficiently widely cover the data storage phosphor plate and can transmit laser beams, no space adapted to laser scanning is necessary. This allows laser-stimulated luminescence to be efficiently taken in. Further, since the above-mentioned fluoroscopic plate can be used as it is fixed in the proximity of the data storage phosphor plate, no transferring mechanism provided in the vicinity of the data storage phosphor plate is necessary, thus simplifying the mechanism and eliminating the variation in output signals with the transfer. Further, the use of the data storage phosphor plate while cooling the same is facilitated. Since a majority of scanning laser beams reflected from the data storage phosphor plate pierces the above-mentioned fluoroscopic plate, the S/N ratio of the output signals is not decreased when the reflected laser beams is guided to a photodetector by way of the fluoroscopic plate.

When a material which absorbs ultraviolet luminescence and emits blue luminescence is used in the fluoroscopic plate, laser-stimulated ultraviolet luminescence, which cannot be utilized in conventional transparent sheets, can also be utilized to expand the scope of utilization of a data storage phosphor material.

Accordingly, this type of fluoroscopic plate is desirably used for taking in laser-stimulated luminescence particularly where the laser-stimulable phosphor plate is made of the above-mentioned CsI:Na which mainly emits ultraviolet luminescence as laser stimulated luminescence.

The thickness of the fluoroscopic plate is preferably large enough to sufficiently absorb laser-stimulated luminescence. In this sense, although it depends on the material, the thickness is preferably about 1 to 2 mm. When the thickness is below the above-mentioned range, the fluoroscopic plate disadvantageously cannot sufficiently absorb ultraviolet luminescence. When the thickness is above the above-mentioned range, not only can no particular benefit be obtained, but also the cost is increased while there arises an inconvenience in handling.

DESCRIPTION OF THE PREFERRED EMBODIMENTS

Figure 1:
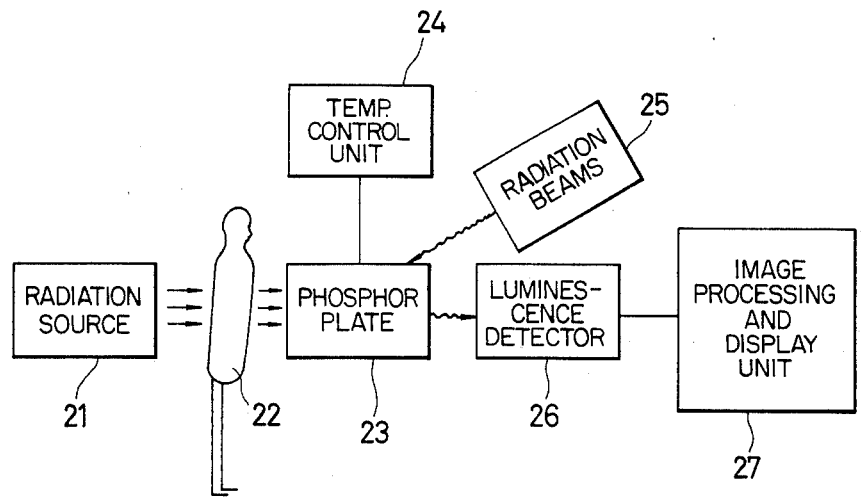
FIG. 1 is a diagram showing the overall constitution of an information reading apparatus for radiation image according to the present invention.

The constitution of an information reading apparatus for radiation image is shown in FIG. 1, in which the numeral 21 refers to a radiation generation source, 22 to an object to be subjected to information reading, 23 to a laser-stimulable phosphor plate, 24 to a temperature control unit, 25 to radiation beams for reading, 26 to a laser-stimulated luminescence detector, and 27 to an image processing and display unit.

The present invention is concerned with the laser-stimulable phosphor plate 23, the laser-stimulated luminescence detector 26, and an image signal transmission means therebetween in the above-mentioned apparatus.

EXAMPLE 1

A mixture of a CsI powder and 0.003 mol % of a NaI powder was placed in a tantalum boat, and heat-melted by applying an electric current therethrough in a vacuum evaporation and deposition apparatus. On the other hand, an Al substrate was set over the tantalum boat and kept at 400° C. A shutter disposed between the Al substrate and the tantalum boat was opened to start vacuum evaporation on the substrate, and was closed when the film thickness reached 200 μm, followed by spontaneous cooling to room temperature. The resulting phosphor plate was cooled to the liquid nitrogen temperature (77° K.), and was irradiated with X-rays and subsequently with semiconductor laser beams of 830 nm to emit ultraviolet and blue laser-stimulated luminescences. While maintaining the liquid nitrogen temperature, the phosphor plate was scanned with laser beams to emit laser-stimulated luminescence, which is then guided to a photomultiplier, where X-ray image information formed in the irradiated plate could be converted into electric signals in time sequence.

A transparent sheet which guided the laser-stimulated luminescence to the photomultiplier was made of an acrylic resin transparent to ultraviolet luminescence, and had a distance of luminescence passage in the acrylic resin of about 5 cm.

The X-ray irradiation was made in a dose of 500 mR at a voltage of 80 kV, while the laser beams was of 30 mW.

In the present invention, the laser-stimulable phosphor plate must be kept cooled at a temperature of 86° K. or lower during the course ranging from X-ray irradiation to completion of scanning with laser beams. At a temperature exceeding 86° K., positive holes in the laser-stimulable phosphor will move to recombine with trapped electrons to emit luminescence. Thus, X-ray image information cannot be accumulated.

The laser-stimulated luminescence was passed through a filter to attenuate the blue luminescence, and was then guided to the photomultiplier.

When the thickness of the laser-stimulable phosphor plate is smaller than 100 μm, a majority of X-rays disadvantageously pierces through the plate, thus increasing undesirably the necessary amount of X-rays. When it is larger than 600 μm, almost all of X-rays are absorbed. However, a long time is required for vacuum evaporation of a thick plate. Thus, the plate thickness is preferably 150 μm or larger, more preferably 150 to 450 μm.

The decay time of laser-stimulated ultraviolet luminescence used in this Example was about 1/500 or less of that of blue luminescence and the resolution of image information thereof was remarkably high. The value of MTF (modulation transfer function) at 2 lp/mm was about 40% in the case of a conventional laser-stimulable phosphor plate while it was remarkably improved to reach about 60% in this Example.

EXAMPLE 2

A mixture of a CsI powder and 0.003 mol % of a NaI powder was filled in an optical cell comprising transparent quartz plates confronting each other at a distance of 1 mm therebetween, and heated in an Ar atmosphere at 700° C. for 3 hours to melt the contents, followed by gradual cooling.

The cell was kept at 77° K. and irradiated with X-rays and subsequently with semiconductor laser beams of 830 nm to emit laser-stimulated ultraviolet and blue luminescences.

EXAMPLE 3

Figure 2:
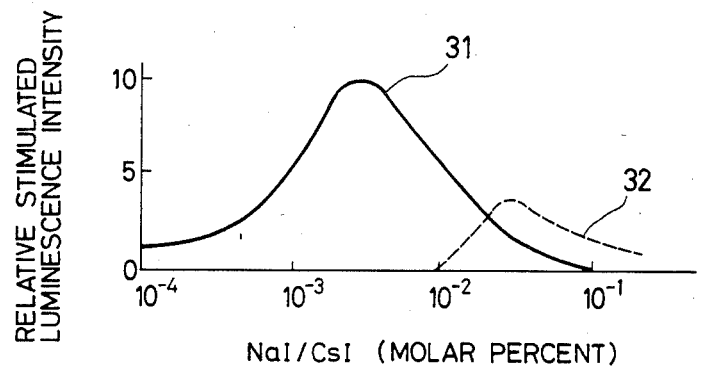
FIG. 2 is a diagram showing a curve of the dependence of the laser-stimulated luminescence output of CsI:Na on the Na concentration thereof.

CsI:Na phosphor plates having mutually different Na concentrations were prepared by the method as described in Examples 1 and 2, and examined as to laser-stimulated luminescence output. The photomultiplier used in the measurement of the output was a model R 647 manufactured by Hamamatsu Photonics Co., Ltd. (wavelength providing a peak sensitivity: 400 nm and wavelengths providing a sensitivity of ½ of the peak sensitivity: 295 nm and 520 nm), while a UVD 36 B filter (wavelength providing a peak transmittance: 350 nm) and a V 42 filter (wavelength providing a peak transmittance: 404 nm) both manufactured by Toshiba Corporation were used for ultraviolet luminescence and blue luminescence, respectively. The examined dependances of luminescence output on the Na concentration are shown in FIG. 2. The curve 31 shows the dependance for ultra-violet luminescence, while the curve 32 shows the dependance for blue luminescence. As is apparent from the figure, it is possible to provide a laser-stimulated ultraviolet luminescence output of twice or more as much as the maximum laser-stimulated blue luminescence output by optimizing the Na concentration.

In a comparison in afterglow characteristics between laser-stimulated blue luminescence and laser-stimulated ultraviolet luminescence, the decay time of the laser-stimulated ultraviolet luminescence is markedly shorter than that of the blue luminescence, thus proving that the laser-stimulated ultraviolet luminescence is suitable for high-speed information reading of an X-ray image having a high spacial resolution.

It was found in the above experiment that the Na concentration of CsI:Na used in an information reading apparatus for radiation image according to the present invention is preferably 0.0003 to 0.03%, more preferably 0.001 to 0.01% in atomic ratio.

EXAMPLE 4

Figure 3:
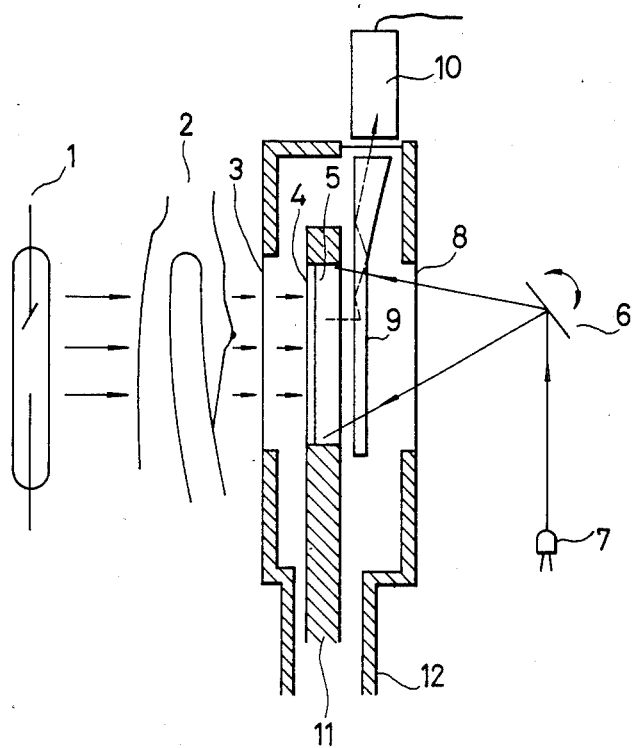
FIG. 3 is a typical schematic view of an information reading apparatus for radiation image according to the present invention.
Figure 4:
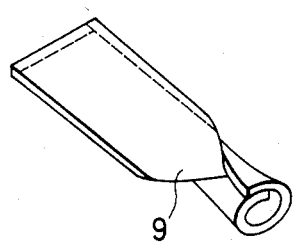
FIG. 4 is a perspective view of an example of a fluoroscopic plate capable of converting laser-stimulated luminescence into fluorescence.
Figure 5:
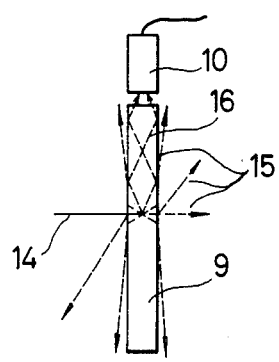
FIG. 5 is a diagram illustrating the principle of converting laser-stimulated luminescence into fluorescence and guiding the fluorescence to a photodetector.

This Example will now be described with reference to FIGS. 3 and 4. FIG. 3 is typical schematic view of an information reading apparatus for radiation image, which can convert an X-ray image obtained by transmission of X-rays through a human body into electric signals in time sequence. X-rays emitted from an X-ray tube (1) pierce through an object (2) such as a human body, an Al window plate (3), and an Al substrate (4) to strike a laser-stimulable (date storage) phosphor plate (5). Part of the energy is accumulated in the phosphor plate. On the other hand, two-dimensional scanning of laser beams is effected to allow the laser beams to pierce through an optical window (8) and a fluoroscopic plate (9) (which converts laser-stimulated luminescence into fluorescence having wavelengths different from those of the luminescence) and irradiate the laser-stimulable phosphor plate (5). The two-dimensional scanning is effected by using a galvanomirror (6) in one direction and by moving a laser beam source (7) and a mirror in the other direction. Upon irradiation with laser beams, the accumulated incident X-ray energy is converted into laser-stimulated luminescence, which strikes the fluoroscopic plate (9) provided in confrontation with the data storage phosphor plate. The luminescence is converted into fluorescence in the fluoroscopic plate (9). The fluorescence repeats total reflection in the plate to converge at an edge of the plate. The converged fluorescence strikes a photodetector (10), such as a photomultiplier, disposed near that edge to be converted into electric signals. One example of the form of the fluoroscopic plate (9) is shown in FIG. 4. The edge surfaces of the fluoroscopic plate (9) other than the edge surface confronting the photodetector (10) are treated so as to reflect light.

In this Example, the dose of X-rays, the output of laser beams, etc. are the same as in Example 1.

One specific instance of FIG. 3 will now be described in detail.

A CsI film deposited by vacuum evaporation and having a thickness of 200 $\mu$m is used as the laser-stimulable phosphor plate. The CsI used contains 0.003 mol % of Na added thereto. The phosphor plate efficiently absorbs incident X-rays (about 65% in the case of using an 80 kV X-ray tube), and accumulates therein part of their energy at a low temperature (77° K.). The accumulated energy is released mainly as laser-stimulated ultraviolet luminescence by scanning $Ga_{1-x}Al_xAs$ semiconductor laser beams (780 nm–830 nm). The laser-stimulated ultraviolet luminescence is absorbed in the fluoroscopic plate (9), wherein it is converted into fluorescence. A plastic scintillator can be used as the fluoroscopic plate. It is made of, for example, an acrylic resin or polystyrene containing 4,4'-bis-2,5-dimethylstyryldiphenyl or naphthylphenyloxazole dissolved therein. This fluoroscopic plate absorbs the above-mentioned laser-stimulated ultraviolet luminescence and emits fluorescence of around 410 nm, which is efficiently converted into electric signals by a photomultiplier.

The thickness of the fluoroscopic plate (9) is 2 mm. The fluoroscopic plate (9) is fixed in confrontation with the laser-stimulable phosphor plate. There is no necessity for any change in the positional relation therebetween in accordance with optical scanning. Accordingly, when the above-mentioned fluoroscopic plate is confronted with the laser-stimulable phosphor plate cooled with a thermally conductive holder (11) while containing both of them in a vacuum container (12), two-dimensional beam scanning can be easily made through an optical window (8).

When the wavelengths of the laser-stimulated luminescence are within the ultraviolet range, a properly chosen fluorescent material can convert the laser-stimulated luminescence into a light within a range of wavelengths providing a maximum sensitivity of a photodetector (usually around 400 nm in the case of a photomultiplier), which light is efficiently guided to a photodetector with the above-mentioned plate.

In this respect, a phosphor capable of emitting laser-stimulated luminescence mainly within a range of wavelengths of 290 to 360 nm is preferably used in the data storage phosphor plate, while a phosphor capable of emitting fluorescence mainly within a range of wavelengths of 360 to 450 nm is preferably chosen as the material of the fluoroscopic plate. Other phosphors can, of course, be used.

The further examples are concerned with cases where other fluorescent substances are used in the above-mentioned data storage phosphor plate. In the following Examples, only data storage phosphor plates will be described and other description will be dispensed with because it is the same as in Example 4.

EXAMPLE 5

A mixture of a CsI powder and 0.003 mol % of a CuI powder is placed in a tantalum boat and heat-melted by applying an electric current therethrough in a vacuum evaporation and deposition apparatus. On the other hand, an Al substrate was set over the tantalum boat and kept at 400° C. A shutter disposed between the Al substrate and the tantalum boat was opened to start vacuum evaporation on the substrate, and was closed when the film thickness reached 250 $\mu$m, followed by spontaneous cooling to room temperature. The resulting phosphor plate was cooled to the liquid nitrogen temperature (77° K.) and irradiated with X-rays and subsequently with semiconductor laser beams of 830 nm to emit ultraviolet and blue laser-stimulated luminescences.

When the thickness of the data storage phosphor plate is smaller than 100 $\mu$m, a majority of X-rays disadvantageously pierces through the plate, thus increasing undesirably the necessary amount of X-rays. When it is larger than 600 $\mu$m, almost all of X-rays are absorbed. However, a long time is required for vacuum evaporation of a thick plate, which is liable to have a slightly low resolution. Thus, the plate thickness is preferably 150 to 450 $\mu$m.

Where use was made of X-rays emitted from an X-ray tube of 80 kV in tube voltage using a W target, which are a typical example of medical X-rays, a conventional laser-stimulable phosphor powder-screened plate absorbed about 50% of incident X-rays at about 450 $\mu$m, while the CsI plate of this Example characteristically absorbed 90% of incident X-rays at about 400 $\mu$m with a slight light scattering in the plate.

EXAMPLE 6

A CsI powder and 0.003 mol % of AuI (used in the form of a solution thereof in an aqueous HI solution) were mixed, dried, and filled in an optical cell comprising a pair of transparent quartz plates confronting each other at a distance of 1 mm. The contents were heated in an Ar atmosphere at 700° C. for 3 hours to be molten, followed by gradual cooling.

The cell was cooled by liquid nitrogen and irradiated with X-rays and subsequently with semiconductor laser beams of 830 nm to emit laser-stimulated ultraviolet and blue luminescences.

EXAMPLE 7

0.003 mol % of NaI (used in the form of a solution thereof in methanol) was added simultaneously in addition to AuI in substantially the same procedure as in Example 6 to emit laser-stimulated ultraviolet and blue luminescences.

EXAMPLE 8

CuI (used in the form of a solution thereof in aqua ammonia) was used instead of AuI in substantially the same procedure as in Example 6 to emit laser-stimulated ultraviolet and blue luminescences.

EXAMPLE 9

$HgI_2$ (used in the form of a solution thereof in an aqueous HI solution) was used instead of AuI in substantially the same procedure as in Example 6 to emit laser-stimulated ultraviolet and blue luminescences.

EXAMPLE 10

0.003 mol % each of $HgI_2$ (used in the form of a solution thereof in an aqueous HI solution) and NaI (used in the form of a solution thereof in methanol) were simultaneously added instead of AuI in substantially the same procedure as in Example 6 to emit laser-stimulated ultraviolet and blue luminescences.

EXAMPLE 11

0.003 mol % each of TlI and NaI were simultaneously added instead of AuI in substantially the same procedure as in Example 6 to emit laser-stimulated ultraviolet and blue luminescences.

EXAMPLE 12

0.003 mol % each of InI and NaI were simultaneously added instead of AuI in substantially the same procedure as in Example 7 to emit laser-stimulated ultraviolet and blue luminescences.

EXAMPLE 13

A CsI powder and 0.05 mol % each of $ZnI_2$ and NaI were mixed together and filled in a quartz ampule. After vacuum heating, the ampule was sealed. The contents were heat-melted at 670° C. for 2 hours and 15 minutes, followed by spontaneous cooling and cooling with liquid nitrogen. After irradiation with X-rays, the ampule was irradiated with a halogen lamp [equipped with a visible light cutting filter IR-82 (manufactured by Fuji Photo Film Co., Ltd.) to emit laser-stimulated luminescence, which was detected with a photomultiplier R647 (manufactured by Hamamatsu Photonics Co., Ltd.) [equipped with an infrared filter CF-B (manufactured by Nippon Shinku Kogaku K.K.)].

EXAMPLE 14

Substantially the same results were obtained when RbI or $MgI_2$ was used instead of $ZnI_2$ in substantially the same procedure as in Example 13.

Examples have been described. As is apparent from the laser-stimulated luminescence emitting mechanism, any material capable of forming electron traps in CsI can be used as an additive added in a slight amount which is effective in emitting laser-stimulated luminescence. Examples of such an additive include Li, Na, K, Rb, Be, Mg, Ca, Sr, Ba, Zn, Cd, Hg, B, Al, Ga, In, Tl, Sc, Y, La, Ce, Pr, Nd, Sm, Eu, Gd, Tb, Dy, Ho, Er, Tm, Yb, Lu, Si, Ti, Zr, Ge, Sn, Pb, As, Sb, and Bi.

The mechanisms of functioning of these additives include the following cases:

(1) Added ions having a charge different from that of matrix ions are substituted for matrix ions to form electron traps (e.g., substitution of $Cs^+$ with $Sr^{2+}$);

(2) Added ions having an ionization potential different from that of matrix ions forms electron traps (e.g., $Na^+$ becomes $Na^0$ by capturing an electron); and (3) Added ions interstitially intrude to form electron traps.

Without any additive as mentioned above, free electrons formed by irradiation with radiation move around in a wide range, thus providing a high probability of recombining with $V_k$ centers. Thus, irradiation energy is released in the form of fluorescence during irradiation with the radiation with a little probability of accumulation of luminescence. Therefore, the laser stimulation efficiency is too low to be suited to an information reading apparatus for radiation image.

When the concentration of the additive is lower than a given level, the amount of laser-stimulated luminescence is saturated in connection with the dose of radiation since the electron traps are substantially filled up by free electrons formed by the radiation. When the concentration of the additive exceeds a given level, the laser stimulation efficiency is lowered by precipitation of the additive and formation of non-luminescent recombination centers.

The electron trap concentration wherein the amount of laser-stimulated luminescence is saturated in connection with the dose of radiation will now be calculated. On the assumption that the upper limit of the dose of medical X-rays may be 1 R (roentgen), the concentration of free electrons formed by this dose will be calculated. The X-ray energy is assumed to be 50 keV. 1 $R = 4.2 \times 10^{10}$ (50 keV) X-photon number/cm$^2$.

Since a CsI plate having a thickness of 200 μm absorbs 65% of incident X-rays, the concentration of absorbed X-rays is:

$4.2 \times 10^{10} \times 0.65 \times (200 \times 10^{-4})^{-1} = 1.365 \times 10^{12}$ (50 keV) X-photon number/cm$^3$.

Since the electron-hole pair formation energy is about thrice the band gap (5.64 eV in CsI), the concentration of the formed free electrons is:

$1.365 \times 10^{12} \times 50 \times 10^3 \times (5.64 \times 3)^{-1} = 4 \times 10^{15}$/cm$^3$.

Since CsI has a body-centered cubic lattice with a lattice constant of 4.57 Å, (concentration of formed free electrons)/(concentration of Cs ions) $= 4 \times 10^{15} \times (4.57 \times 10^{-8})^3 = 3.8 \times 10^{-7}$.

If an electron trap concentration at least thrice as much as the concentration of the formed free electrons are introduced, minimum electron trap concentration $\approx 10^{-6}$ (in atomic ratio relative to Cs). Thus, 0.0001% (in atomic ratio) or more of an additive is necessary.

In general, when the additive concentration exceeds 1% (in atomic ratio), the laser stimulation efficiency is remarkably lowered. Thus, the additive concentration is preferably 0.0001% to 1%, more preferably 0.001% to 0.1%, in atomic ratio.

It will be understood from the above-mentioned mechanism that the presence of two or more kinds of additives is also effective.

As is apparent from the above description, utilization of the ultraviolet component of laser-stimulated luminescence in an information reading apparatus for radiation image using laser-stimulated luminescence of CsI:Na can provide image information with a short decay time and a high signal output, which enables reading of radiation image with a high spacial resolution.

With a simplified apparatus having no transferring mechanism in the vicinity of a data storage phosphor plate, the efficiency of detection of laser-stimulated luminescence can be improved, and the noise level of output signals produced by reflection of laser beams for reading can be decreased. Further, utilization of a cooled data storage phosphor plate and a laser-stimulable, ultraviolet luminescence-emitting data storage phosphor plate is facilitated, thus providing an effect of notably expanding the scope of choice of materials.

What is claimed is:

1. An information reading apparatus for radiation image which reads radiation image information by optically scanning a laser-stimulable phosphor plate having a radiation image recorded thereon to emit laser-stimulated luminescence corresponding to said image from said phosphor plate and converting said laser-stimulated luminescence into electric signals, wherein said laser-stimulable phosphor plate is constituted of CsI as the base and laser-stimulated luminescence within a range of wavelength of 290 to 360 nm is converted into said electric signals.

2. An information reading apparatus for radiation image as claimed in claim 1, wherein said laser-stimulable phosphor plate constituted of CsI as the base contains 0.0003 to 0.03% of Na in atomic ratio.

3. An information reading apparatus for radiation image as claimed in claim 2, wherein said laser-stimulable phosphor plate constituted of CsI as the base contains 0.001 to 0.01% of Na in atomic ratio.

4. An information reading apparatus for radiation image as claimed in claim 2, wherein said laser-stimulable phosphor plate has a thickness of 150 to 450 $\mu$m.

5. An information reading apparatus for radiation image which reads radiation image information by optically scanning a laser-stimulable phosphor plate using a light beam, said laser-stimulable phosphor plate having a radiation image recorded thereon to emit laser-stimulated luminescence corresponding to said image from said phosphor plate and converting said laser-stimulated luminescence into electric signals, said apparatus comprising a fluoroscopic plate for converting laser-stimulated luminescence emitted from said laser-stimulable phosphor plate into fluorescence having wavelengths different from those of said laser-stimulated luminescence, said fluoroscopic plate being transparent to said light beam for optically scanning said laser-stimulable phosphor plate, and a photodetector for detecting said fluorescence emitted from said fluoroscopic plate.

6. An information reading apparatus for radiation image as claimed in claim 5, wherein said fluoroscopic plate is disposed in confrontation with said laser-stimulable phosphor plate, and said photodetector is disposed in the proximity of an edge of said fluoroscopic plate while the edges of said fluoroscopic plate other than said edge is reflective of light.

7. An information reading apparatus for radiation image as claimed in claim 6, wherein said fluoroscopic plate has a thickness of about 1 to 2 mm.

8. An information reading apparatus for radiation image as claimed in claim 6, wherein said fluoroscopic plate is a plastic scintillator.

9. An information reading apparatus for radiation image which reads radiation image information by optically scanning a laser-stimulable phosphor plate having a radiation image recorded thereon to emit laser-stimulated luminescence corresponding to said image from said phosphor plate and converting said laser-stimulated luminescence into electric signals, wherein said laser-stimulable phosphor plate is constituted of CsI as the base and 0.0001 to 1% in atomic ratio of at least one element selected from the group consisting of Li, K, Rb, Cu, Au, Be, Mg, Ca, Sr, Ba, Zn, Cd, Hg, B, Al, Ga, In, Tl, Sc, Y, La, Ce, Pr, Nd, Sm, Eu, Gd, Tb, Dy, Ho, Er, Tm, Yb, Lu, Si, Ti, Zr, Ge, Sn, Pb, As, Sb, and Bi.

10. An information reading apparatus for radiation image as claimed in claim 9, wherein the amount of said at least one element is 0.001 to 0.1% in atomic ratio.

11. An information reading apparatus for radiation image as claimed in claim 9, wherein said laser-stimulable phosphor plate further comprises Na and has a total content of Na and said at least one element of 0.0001 to 1% in atomic ratio.

12. An information reading apparatus for radiation image as claimed in claim 11, wherein said total content is 0.001 to 0.1% in atomic ratio.

13. An information reading apparatus for reading radiation images, comprising:
   a laser-stimulable phosphor plate made of CsI as a base material and capable of recording a radiation image thereon;
   a laser source for supplying scanning laser beams to irradiate said phosphor plate and produce laser-stimulated luminescence;
   a fluoroscopic plate disposed in a position between said phosphor plate and said laser source, which is transparent to said scanning laser beam and which converts said laser-stimulated luminescence into fluorescence having wavelengths different from those of said laser-stimulated luminescence; and
   a photodetector disposed near an edge of said fluoroscopic plate, to detect said fluorescence.

14. An information reading apparatus according to claim 13, wherein said phosphor plate is made of CsI containing 0.0003 to 0.03% Na in atomic ratio.

15. An information reading apparatus according to claim 14, wherein said phosphor plate is made of CsI containing 0.001 to 0.01% Na in atomic ratio.

16. An information reading apparatus according to claim 13, wherein said phosphor plate is 150 to 450 $\mu$m thick.

17. An information reading apparatus according to claim 13, wherein edges of said fluoroscopic plate other than said edge to which said photodetector is disposed near, are treated to reflect light.

18. An information reading apparatus according to claim 13, wherein said fluoroscopic plate is 1 to 2 mm thick.

19. An information reading apparatus according to claim 13, wherein said phosphor plate is made of CsI containing 0.0001 to 1% in atomic ratio of at least one element selected from the group consisting of Li, K, Rb, Cu, Au, Be, Mg, Ca, Sr, Ba, Zn, Cd, Hg, B, Al, Ga, In, Tl, Sc, Y, La, Ce, Pr, Nd, Sm, Eu, Gd, Tb, Dy, Ho, Er, Tm, Yb, Lu, Si, Ti, Zr, Ge, Sn, Pb, As, Sb, and Bi.

20. An information reading apparatus according to claim 19, where the amount of said at least one element is 0.001 to 0.1% in atomic ratio.

* * * * *